(No Model.)

J. D. CARR.
HAY FORK.

No. 440,011. Patented Nov. 4, 1890.

Witnesses
Sam'l R. Turner:
Van Buren Hillyard.

Inventor
James D. Carr.
By his Attorneys
R. S. & A. P. Lacey

UNITED STATES PATENT OFFICE.

JAMES D. CARR, OF SAUK CENTRE, MINNESOTA.

HAY-FORK.

SPECIFICATION forming part of Letters Patent No. 440,011, dated November 4, 1890.

Application filed June 16, 1890. Serial No. 355,564. (No model.)

*To all whom it may concern:*

Be it known that I, JAMES D. CARR, a citizen of the United States, residing at Sauk Centre, in the county of Stearns and State of Minnesota, have invented certain new and useful Improvements in Hay-Forks; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to hay-forks which comprise a shank and folding flukes.

The object of the invention is to combine with the shank forks which are pivoted at their inner ends to the shank, and which are connected by rods with the said flukes, the said forks and flukes operating simultaneously and the arms of the forks serving as levers for the flukes. The purpose of the forks is to prevent the scattering of the hay or straw and to hold the same in a compact form.

The improvement consists of the novel features and the peculiar construction and combination of the parts, which will be hereinafter more fully described and claimed, and shown in the annexed drawings, in which—

Figure 1:
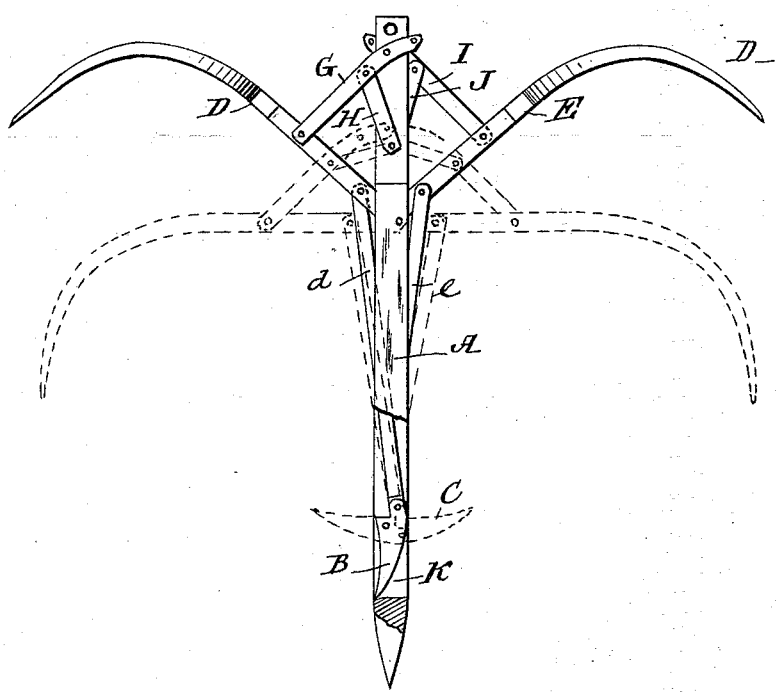
Figure 2:
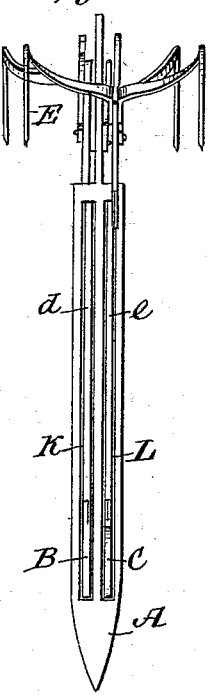
Figure 3:
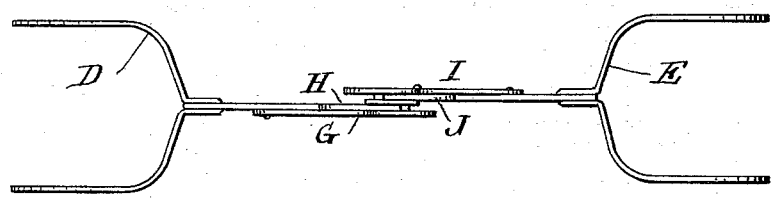

Figure 1 is a side view, parts being broken away, of a hay-fork embodying my invention, showing the operation of the same by dotted lines. Fig. 2 is an edge view of the fork. Fig. 3 is a top plan view of a fork.

The shank A is pointed at its lower end, and its upper end is apertured or otherwise constructed to receive the hoisting-rope. The flukes B and C are pivoted between their ends to the lower end of the shank, and are connected at their inner ends with the arms of the forks D and E by the rods $d$ and $e$, respectively. The arms of the forks are pivoted at their ends to the shank, and the rods $d$ and $e$ have pivotal connection with said arms within their pivotal supports, the said rods extending obliquely across the shank from one side to the other. The arm of the fork D is connected with the shank by the toggle-levers G and I, the toggle-lever G being extended and adapted to have the trip-ropes applied thereto. The arm of the fork E is connected with the shank by toggle-levers I and J, the toggle-lever I being extended in a manner similar to the toggle-lever G and for a like purpose. The flukes B and C fold within slots K and L, which extend through from one side of the shank to the other side and from near the lower end thereof to its upper end. The rods $d$ and $e$ extend through these slots. The shank is preferably composed of three plates or bars that are bolted together at their ends, the plates or bars being separated at their ends by blocks which are bolted between them to form the slots K and L, as will be readily understood.

The operation of the device can be readily understood from the foregoing detailed description, reference being had to the annexed drawings. Hence a further description of the operation is deemed unnecessary.

However, it may be will to state that prior to the insertion of the shank in the shock or bundle of hay or other grain the forks D and E are drawn up at their outer ends, as shown by the full lines in Fig. 1. This movement of the forks withdraws the flukes B and C within the shank, one of which flukes is so shown by full lines in said Fig. 1. The parts being in the position shown in Fig. 1, the shank is thrust into the shock or bundle of grain, after which the forks are turned down to the position shown by dotted lines in Fig. 1, and projects the flukes from the sides of the shank. (See the dotted lines in the said figure.) The hoisting-rope (not shown) is applied directly to the shank, and the releasing-rope (not shown) is applied to the free ends of the toggle-levers G and I. When the load has reached its destination, obviously a pull on the releasing-cord will lift the outer ends of the forks and withdraw the flukes and permit the load to slide off the shank.

Having thus described my invention, what I claim, and desire to secure by Letters Patent, is—

1. The combination, with the shank and the folding flukes, of the forks pivoted to the shank and the rods connecting the said forks with the flukes, substantially as and for the purpose described.

2. The combination, with the shank and the folding flukes, of the forks pivotally connected with the shank and the rods extending obliquely from one side of the shank to the other side and connecting the said forks with the flukes, substantially as described.

3. The combination, with the shank, the flukes, and the forks, of the toggle-levers connecting the forks with the shank, the ends of the toggle-levers, as G and J, being extended, substantially as and for the purpose described.

4. The herein shown and described hay-fork, composed of the shank having slots K and L, the folding flukes, the forks D and E, the rods $d$ and $e$, connecting the forks with the flukes and extending obliquely through the slots K and L, and the toggle-levers G H and I J, the levers G and L being extended, substantially as and for the purpose described.

In testimony whereof I affix my signature in presence of two witnesses.

JAMES D. CARR.

Witnesses:
M. HOGAN,
S. SIMONTON.